United States Patent [19]
Kobayashi

[11] Patent Number: 4,737,773
[45] Date of Patent: Apr. 12, 1988

[54] GRAPHICAL DISPLAY APPARATUS HAVING A COORDINATE CORRECTION CIRCUIT

[75] Inventor: Tadashi Kobayashi, Tokyo, Japan

[73] Assignee: NEC Corporation, Japan

[21] Appl. No.: 772,249

[22] Filed: Sep. 3, 1985

[30] Foreign Application Priority Data

Sep. 4, 1984 [JP] Japan ................ 59-184816
Sep. 4, 1984 [JP] Japan ................ 59-184817

[51] Int. Cl.$^4$ ............................................. G09G 3/02
[52] U.S. Cl. .................................. 340/707; 340/706; 340/727; 340/795
[58] Field of Search ............ 340/707, 709, 706, 712, 340/734, 995, 724, 721, 727, 750; 178/18

[56] References Cited

U.S. PATENT DOCUMENTS

| | | | |
|---|---|---|---|
| 4,295,135 | 10/1981 | Sukonick | 340/721 |
| 4,315,282 | 2/1982 | Schumacher | 340/707 |
| 4,514,688 | 4/1985 | Whetstone | 178/18 |
| 4,523,188 | 6/1985 | Huber | 340/734 |
| 4,543,572 | 9/1985 | Tanaka et al. | 340/721 |
| 4,555,590 | 11/1985 | Kishi et al. | 340/706 |

Primary Examiner—Gerald L. Brigance
Assistant Examiner—Mahmoud Fatahi-yar
Attorney, Agent, or Firm—Laff, Whitesel, Conte & Saret

[57] ABSTRACT

In a graphical display apparatus having a writing pad and a display device, X- and Y-coordinate position signals are generated by the writing pad to indicate the position of a pen on a work area on the data entry surface of the pad. A correction circuit formed by discrete components is operated in a calibration mode to calibrate correction factors in response to the X- and Y-coordinate position signals so that when the pen is located successively in a plurality of reference coordinate work positions a cursor will appear successively in a plurality of reference coordinate positions of the display. In a data entry mode, the correction circuit corrects the X- and Y-coordinate position signals in accordance with the calibrated correction factors, so that the X and Y coordinates of the work area correspond to the X and Y coordinates of said display area. A mircoprocessor-based controller responds to the X- and Y-coordinate position signals supplied from the correction circuit by controlling the X-Y coordinate position of the cursor.

4 Claims, 8 Drawing Sheets

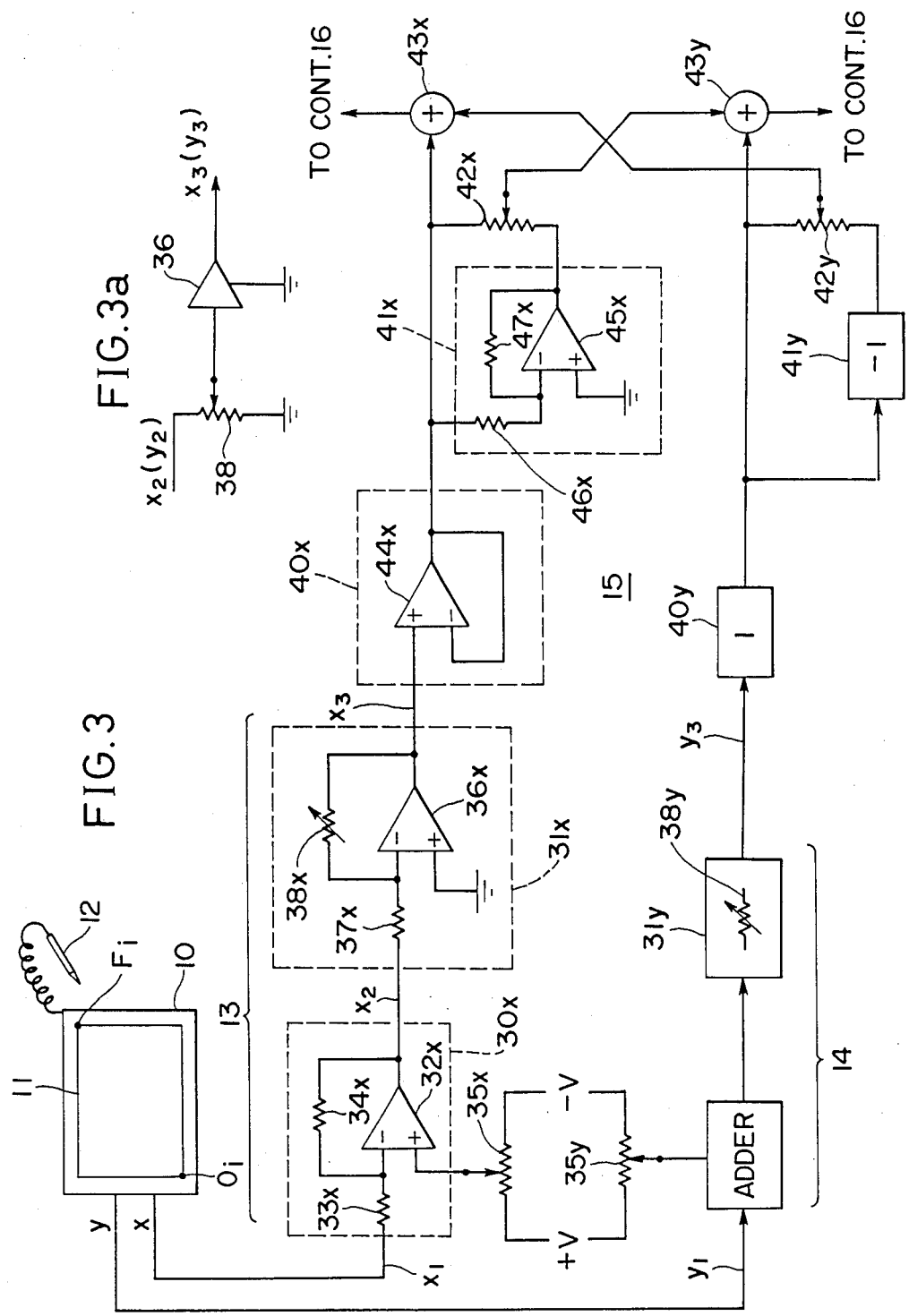

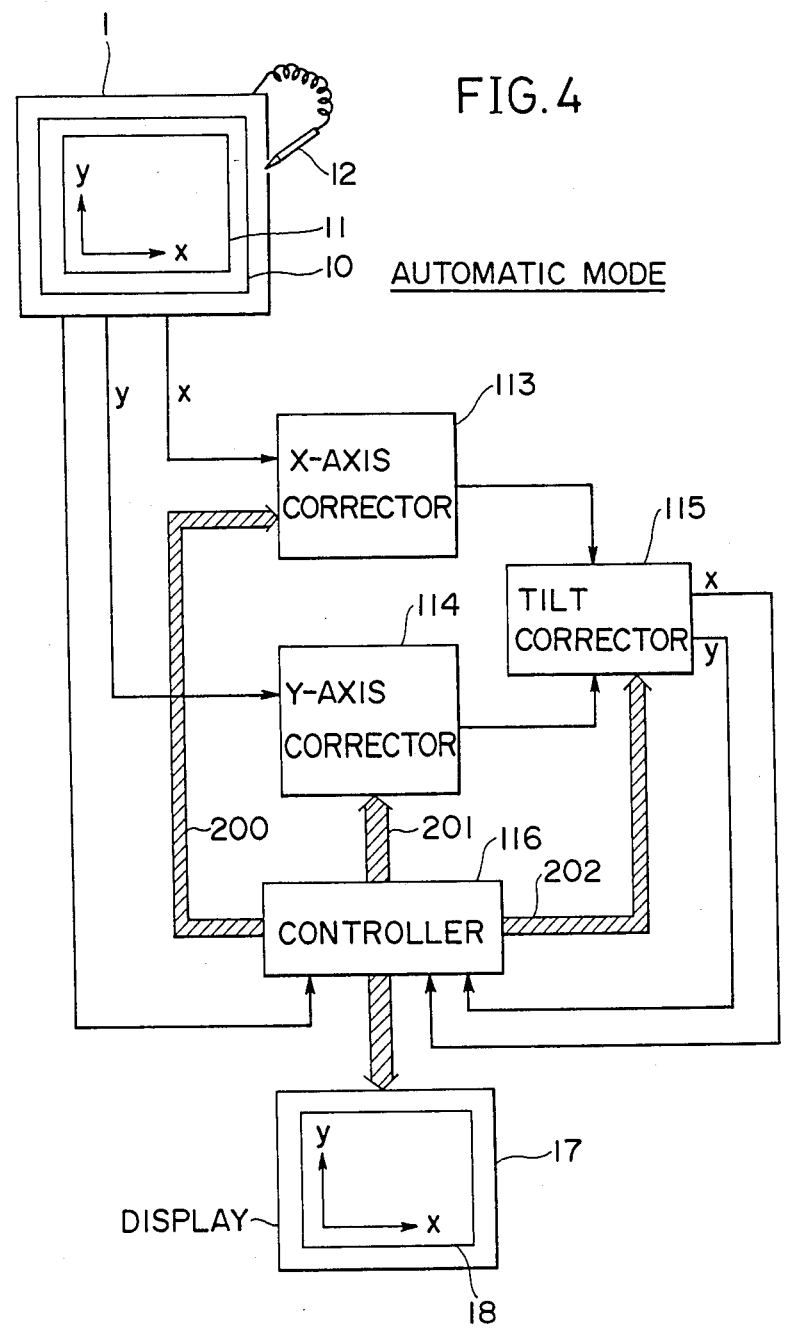

GRAPHICAL DISPLAY APPARATUS HAVING A COORDINATE CORRECTION CIRCUIT

BACKGROUND OF THE INVENTION

The present invention relates to graphic display apparatus having a writing pad, and more particularly to a graphic display apparatus having a correction circuit that translates the X-Y coordinates of a work area on the data entry surface of the pad into the X-Y coordinates of a display area.

Known graphic display apparatus comprise a writing pad, a microprocessor-based controller and a display device. The writing pad has a data entry surface and generates a graphic signal indicating the X-Y coordinate position of a writing pen as it leaves a trace on the entry surface. The microprocessor-based controller responds to the graphic signal by generating digital X-Y coordinate signals to control the X-Y coordinate position of a cursor on the display area. It is advantageous to use a sheet of paper or a transparent plastic sheet to define a work area within the data entry surface of the pad to permit the pen to leave a trace on such permanent record mediums. However, the record mediums may differ in size and may be tilted with respect to the reference directions of the entry surface. Thus, the X-Y coordinate position of the writing pen differs from one record medium to another. Further it is desirable that the size and orientation of the displayed graphic be constant despite different work sizes and areas. This is particularly advantageous for transmitting graphic data between remotely located writing pads over telephone lines.

To overcome this problem, it has been proposed to construct a microprocessor-based controller by including in it a sequence of programmed instructions. During calibration modes, the pen is located at X-Y coordinate reference work positions and differences between these reference work positions are detected. Correction factors are calibrated in accordance with the detected differences and stored into respective memory locations. During data entry modes, the stored calibration data are retrieved from the memory. X-Y coordinate position indicating signals from the pad are corrected in accordance with the retrieved correction data through a number of logical operations involving additions, subtractions and multiplications. However, a sequence of such logical operations takes a substantial amount of time and hence it causes a substantial delay for the cursor to move from one point to another as the pen is rapidly moving on the writing pad. Further, if a plurality of writing pads are connected to a single controller, the memory capacity must be sufficient to store as many correction data as there are writing pads.

SUMMARY OF THE INVENTION

It is therefore an object of the present invention to provide a graphical display apparatus having a quick response characteristic.

Another object of the present invention is to provide a graphical display apparatus which permits as many writing pads as possible to be connected to a single microprocessor-based controller.

A graphical display apparatus of the present invention provides display of graphic data in a display area with a trace of a cursor the position of which is represented by X and Y coordinates. In a first aspect of the invention, the apparatus comprises a writing pad having a data entry surface in which a work area can be specified. The pad generates a position signal indicating the X and Y coordinates of a writing pen moving on the work area. A correction circuit having discrete components is operable in a calibration mode for manually calibrating correction factors in response to the generated X- and Y-coordinate position signals so that when the pen is located successively in a plurality of reference coordinate work positions the cursor will appear successively in a plurality of reference coordinate display positions. In a data entry mode, the correction circuit corrects the X- and Y-coordinate position signals in accordance with the calibrated correction factors, whereby the X and Y coordinates of the work area correspond to the X and Y coordinates of said display area. A microprocessor-based controller responds to the X- and Y-coordinate position signals supplied from the correction circuit during the calibration and data entry modes by controlling the X-Y coordinate position of the cursor. Because of the high processing speed capability of discrete circuits as compared with the speed taken to perform a sequence of steps, the correction circuit introduces no substantial delays during the data entry mode. Further, writing pads can be installed as many as desired by providing as many correction circuits as there are writing pads.

In a preferred embodiment, the apparatus includes a detector operable during calibration mode in response to the position signals and to reference signals representing X- and Y-coordinate reference positions in the display area for automatically detecting differences between the X-Y coordinates of the work area and those of the display area so that when the pen is located successively in a plurality of reference coordinate work positions the cursor will appear successively in a plurality of reference coordinate display positions. The coordinate correction circuit corrects the position signals in accordance with the detected differences so that the X and Y coordinates of the work area correspond to the X and Y coordinates of the display area;

BRIEF DESCRIPTION OF THE DRAWINGS

The present invention will be described in further detail with reference to the accompanying drawings, in which:

FIG. 3 is an illustration of details of the correction circuits of FIG. 1, and FIG. 3a is an illustration of a modified form of the multipliers of FIG. 3;

FIG. 4 is a schematic block diagram of the apparatus of the invention useful for operation in automatic mode;

DETAILED DESCRIPTION

Figure 1:
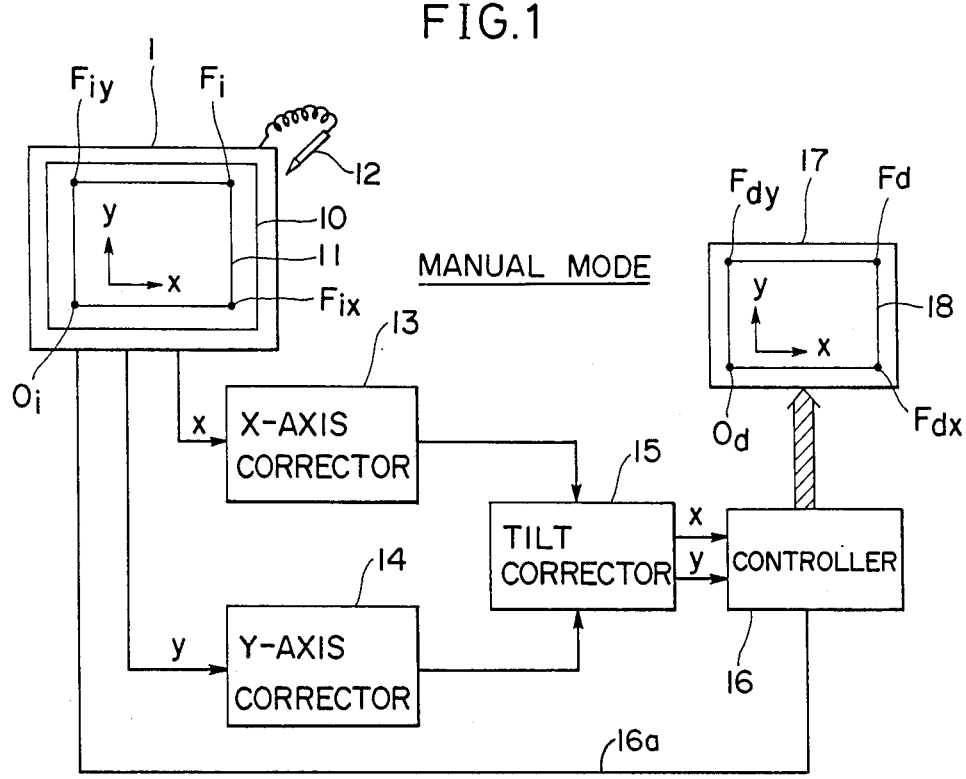
FIG. 1 is a schematic block diagram of a manually controlled graphical display apparatus of the invention.

Shown in FIG. 1 is an embodiment of a graphic display apparatus incorporating coordinate correction circuits constructed according to the present invention. The apparatus includes a display device 17 of a conventional design having means for generating a cursor on a display area 18. The position of the cursor within the display area 18 is represented by X and Y coordinates. A writing pad 1 of a known construction is provided having a rectangular, planar data entry surface 10 on which a work area 11 can be defined. This work area may be a sheet of paper or a transparent plastic film removably attached to the surface 10. A writing pen 12 is handled by a user to leave a trace on the work area 11. The position of pen 12 on the work area is represented by X-Y coordinates. Writing pad 10 generates x- and y-coordinate signals indicating the X and Y coordinates position of the pen 12, which are supplied to X-axis correctors 13 and 14. As will be described in detail later, X-axis corrector 13 provides correction on the x-coordinate signal so that the origin Oi of work area 11 corresponds on the x coordinate axis to the origin Od of display area 18 and Y-axis corrector 14 provides correction on the y-coordinate signal to establish coincidence between the two origins with respect to the y-coordinate axis. X-and Y-axis correctors 13 and 14 further correct full-scale input voltages so that the X-Y coordinates of the work area 11 corresponds with those of the display area 18.

Figure 2:
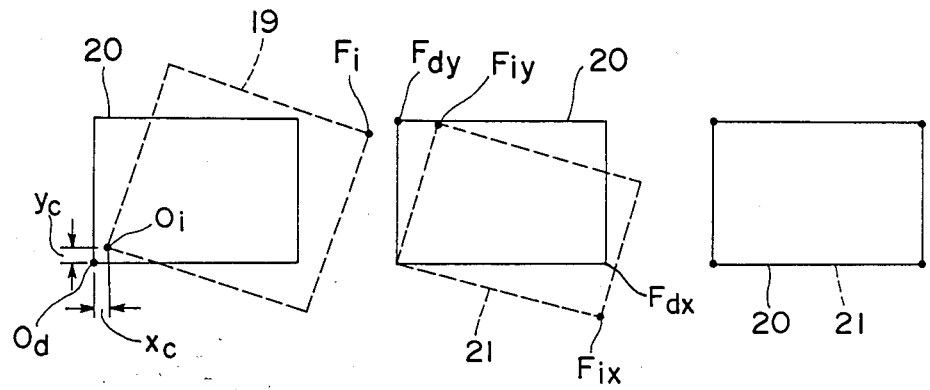
FIG. 2 is an illustration useful for the description of the invention.

In FIG. 2 work area 11 is indicated by a broken-line rectangle 19 which may be tilted with respect to the coordinates of data entry surface 10 and hence to the display area 18 which may be smaller in dimensions than work area 11 as indicated by a solid-line rectangle 20. By establishing a coincidence between the origins of the two rectangles and reducing the full-scale dimensions of the rectangle 19, the work area 11 will appear as shown by a broken-line rectangle 21 whose origin is coincident with the origin of rectangle 20.

The corrected x- and y-coordinate position signals are applied to a tilt corrector 15 to compensate for the tilt angle of the rectangle 21 with respect to the rectangle 20 so that coordinate points on rectangle 21 coincide with those on rectangle 20.

The apparatus further includes a microprocessor-based controller 16 of a known construction. Controller 16 receives the corrected x- and y-coordinate voltages from the tilt corrector 15 and converts them into digital coordinate signals, the latter being fed to the display 17 to produce a light spot, or cursor tracing the position of the pen 12 on work area 11. For this purpose, the writing pad 1 supplies an on-pad signal to the controller 16 on a line 16a when the pen is in contact with work area 11.

Details of the correction circuits 13, 14 and 15 are shown in FIG. 3. X-axis corrector 13 comprises an adder circuit 30x responsive to the x-coordinate voltage from writing pad 1 and a scaling circuit 31x connected to the output of adder circuit 30x. Adder circuit 30x is formed by an operational amplifier 32x having an inverting input coupled via resistor 33x to the x-coordinate output of writing pad 1 and further coupled via resistor 34x to the output terminal thereof. Resistors 33x and 34x have equal resistance values. Amplifier 32x has a noninverting input coupled to the sliding tap of a variable resistor 35x which is connected at opposite ends to a positive voltage source at potential $+V$ and a negative voltage source at potential $-V$. Depending on the location of the sliding tap on resistor 35x the voltage applied to the noninverting input of operational amplifier 32x varies both in magnitude and polarity. The output of amplifier 32x thus represents a difference between the amplifier input voltages when the polarity of the voltage from resistor 35x is positive and represents a sum of these voltages when the polarity of that variable-resistor voltage is negative.

Scaling circuit 31x is formed by an operational amplifier 36x having an inverting input coupled via resistor 37x to the output of adder circuit 30x and further coupled via variable resistor 38x to the output terminal thereof, the noninverting input of operational amplifier 36x being grounded. With this configuration, scaling circuit 31x scales up or down the x-coordinate voltage $x_2$ by a factor $-r/R$ to produce an x-coordinate voltage $x_3$, where R and r represent the resistance values of resistors 37x and 38x, respectively.

Y-axis correction circuit 14 is of identical construction to the x-axis correction circuit 13. Specifically, it includes an adder circuit 30y and a scaling circuit 31y identical to adder circuit 30x and scaling circuit 31x, respectively. Alternatively, each scaling circuit comprises a variable resistor 38, FIG. 3a, through which the voltage $x_2$ ($y_2$) is grounded and an amplifier 36 connected to the sliding tap of the resistor 38.

The effect of the adder circuit 30x is to shift the input x-coordinate voltage such that the cursor appears on the y axis of the display area. This is accomplished by positioning the pen 12 in the origin Oi to apply a corresponding x-coordinate voltage $x_1$ to adder circuit 30x and manually adjusting the variable resistor 35x so that an x-coordinate voltage $x_2$ from amplifier 32x causes the cursor to move a distance $x_c$ in a direction parallel to the x-axis to a y-axis point which is displaced a distance $y_c$ from the origin Od (see FIG. 2).

Likewise, the effect of the adder circuit 30y is to shift the input y-coordinate voltage such that the cursor appears on the x axis of the display area and this is accomplished by positioning the pen 12 in the origin Oi to apply a corresponding y-coordinate voltage $y_1$ to adder circuit 30y and adjusting the variable resistor 35y so that a y-coordinate voltage $y_2$ causes the cursor to move a distance $y_c$ in a direction parallel to the y-axis to an x-axis point which is displaced a distance $x_c$ from the origin Od. Therefore, the cursor can be made to appear on the display origin $O_d$ when the pen 12 is positioned in the work area origin $O_i$ by adjusting the variable resistors 35x and 35y.

Pen 12 is then moved to the full-scale point $F_i$ to generate a pair of x-coordinate voltage $x_1$ and y-coordinate voltage $y_1$, which are respectively shifted by adder circuits 30x and 30y to produce voltages $x_2$ and $y_2$. Assume that the work area is not tilted with respect to the coordinates of the display area 18, variable resistors 38x and 38y are adjusted until the cursor on the display 17 moves to a full-scale point $F_d$.

Tilt corrector 15 comprises unity-gain noninverting buffer amplifiers 40x, 40y through which the voltages $x_3$ and $y_3$ are respectively applied to unity-gain inverting amplifiers 41x, 41y and to first inputs of adders 43x, 43y. The output of the inverting amplifier 41x is connected through a variable resistor 42x to the first input of adder 43x and the output of amplifier 41y is connected through a variable resistor 42y to the first input of adder 43y. The sliding tap of variable resistor 42x is connected to the second input of adder 43y and the sliding tap of resistor 42y is connected to the second input of adder 43x. Each of the unity-gain buffer amplifiers 40x, 40y is of a conventional design and typically comprises an operational amplifier 44 having a noninverting input coupled to the output of the associated axis corrector and an inverting input coupled to its output terminal. Each inverting amplifier 41y comprises an operational amplifier 45 having an inverting input coupled through a resistor 46 to the associated buffer amplifier 40 and further through a feedback resistor 47 to its output terminal, the noninverting input being coupled to ground.

The function of variable resistor 42x is to proportion the positive and negative x-coordinate voltages $x_3$ to provide an offset voltage representing the displacement of a given point on the y-axis of work area 11 from a corresponding point on the y-axis of display area 18 in the direction of the x-axis of work area 11. Likewise, the function of variable resistor 42y is to proportion the positive and negative y-coordinate voltages $y_3$ to generate an offset voltage representing the displacement of a given point on the x-axis of the work area from a corresponding point on the x-axis of the display area in the direction of the y-axis of the work area.

The operation of the tilt corrector 15 is as follows. Assume that the work area 11 is tilted with respect to the x-y coordinates of display area 18 and that the work area origin $O_i$ has been made coincident with the display area origin $O_d$. Pen 12 is moved to an x-axis full-scale point $F_{ix}$ to cause a corresponding x-coordinate voltage $x_1$ and a corresponding y-coordinate voltage $y_1$ to be applied to the x- and y-axis correctors 13 and 14, respectively, resulting in the application of x-coordinate voltage $x_3$ and y-coordinate voltage $y_3$ to the tilt corrector 15. The x-coordinate voltage $x_3$ is summed in the adder 43x with the y-component offset voltage from resistor 42y and the y-coordinate voltage $y_3$ is summed in the adder 43y with the x-component offset voltage from resistor 42x. The outputs of adders 43x and 43y are applied to microprocessor-based controller 16. Variable resistor 42x is adjusted to a zero-level setting and variable resistor 42y is adjusted so that the cursor comes to a point $F_{dx}$ on the x-axis of display area 18. With the variable resistor 42y being thus adjusted, pen 12 is then moved to a y-axis full-scale point $F_{iy}$. Variable resistor 42x is adjusted until the cursor comes to a point $F_{dy}$ on the display area. It will be noted that if full-scale adjustments have not been made the points $F_{dx}$ and $F_{dy}$ may not correspond to the full-scale points of the display area. It is preferred that full-scale corrections be performed after tilt correction has been made.

It is preferred to perform the above-mentioned corrective operations automatically. FIG. 4 is an illustration of a preferred embodiment of the graphic display system which is suitable for this purpose. In this preferred embodiment, the microprocessor-based controller 116 supplies reference data to x-axis corrector 113, y-axis corrector 114 and tilt corrector 115 on respective buses 200, 201 and 202.

Figure 5A:
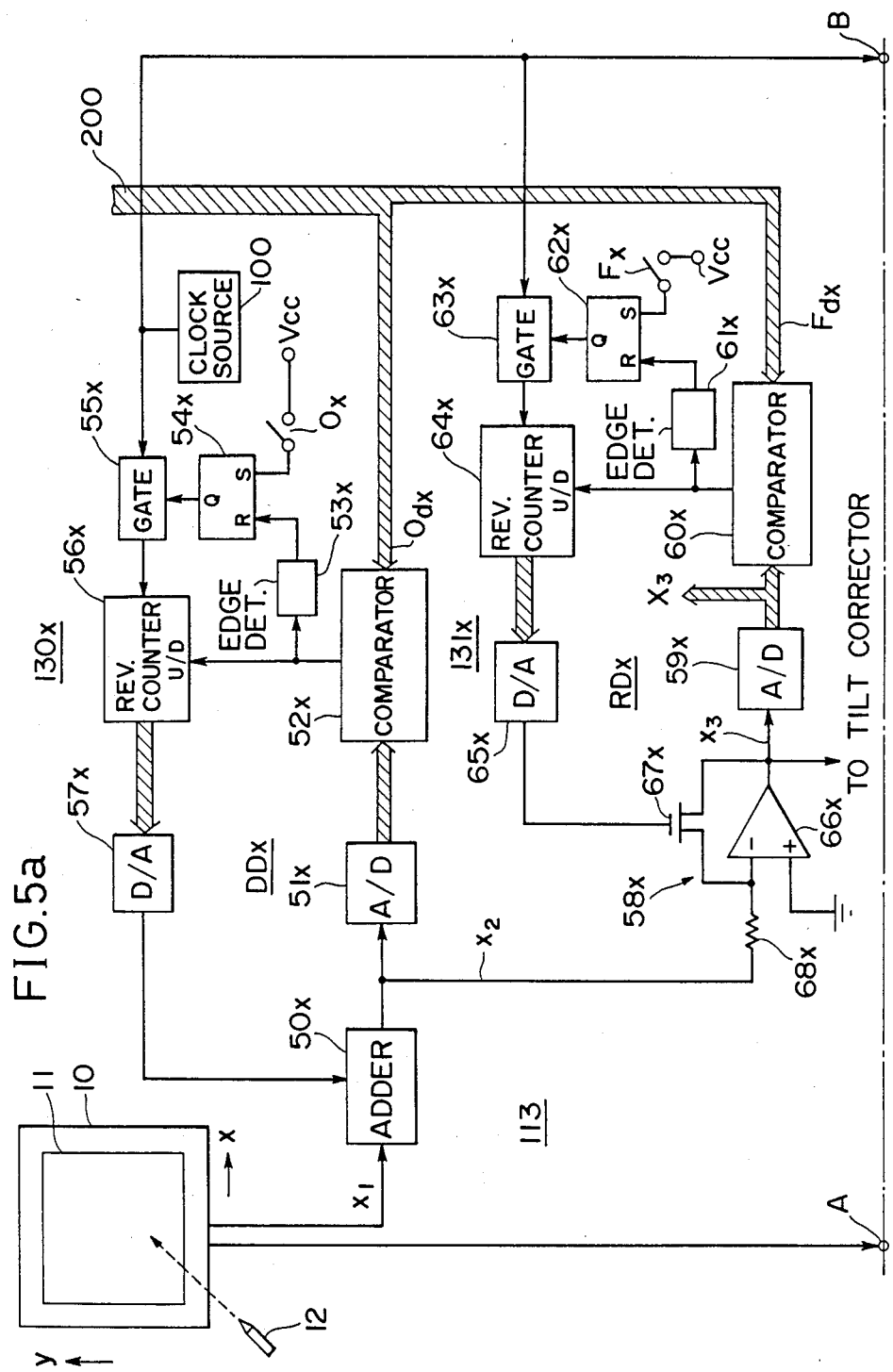
FIGS. 5a, 5b and 5c are illustrations of details of the correction circuits of FIG. 4.
Figure 5B:
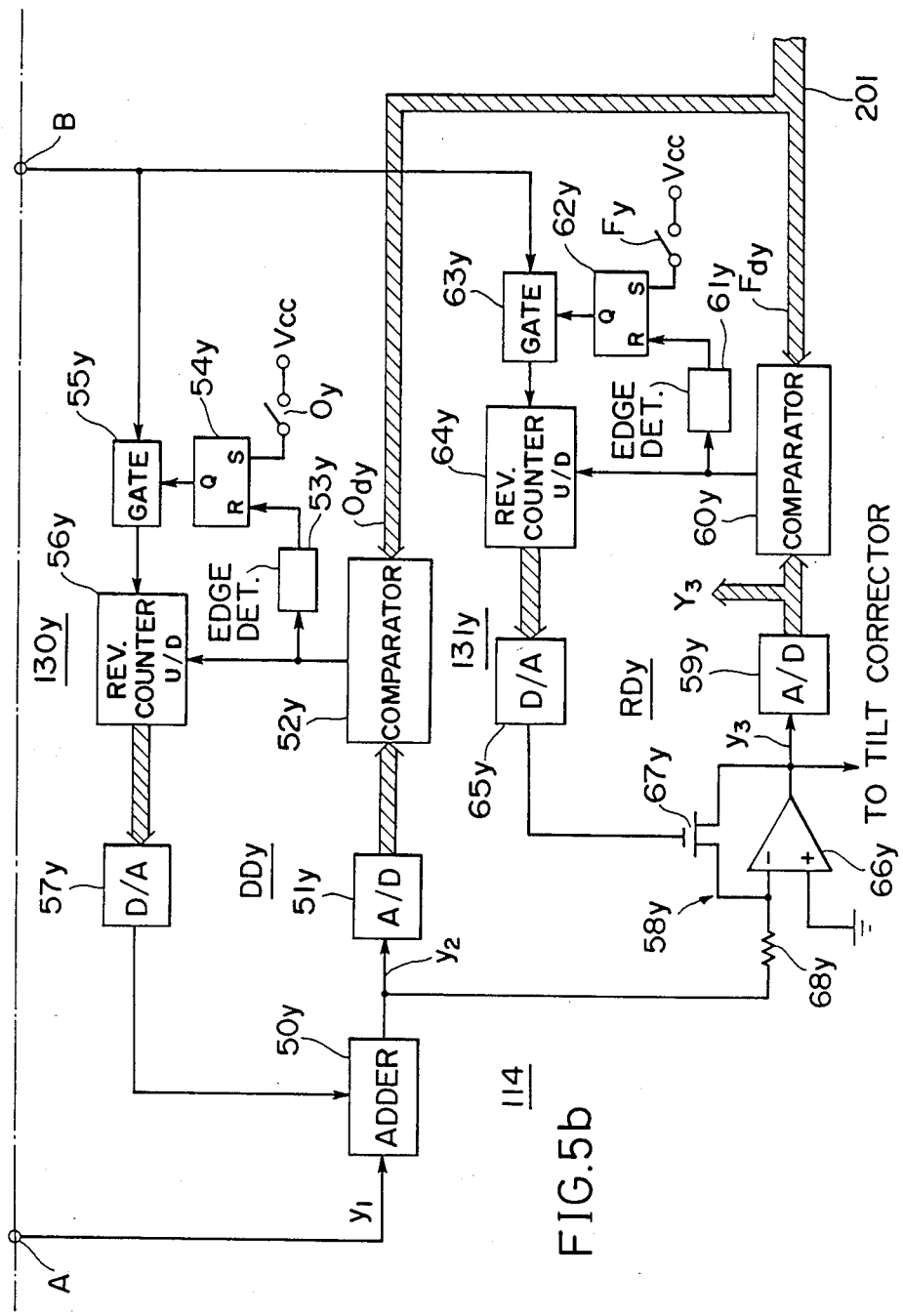
Figure 5C:
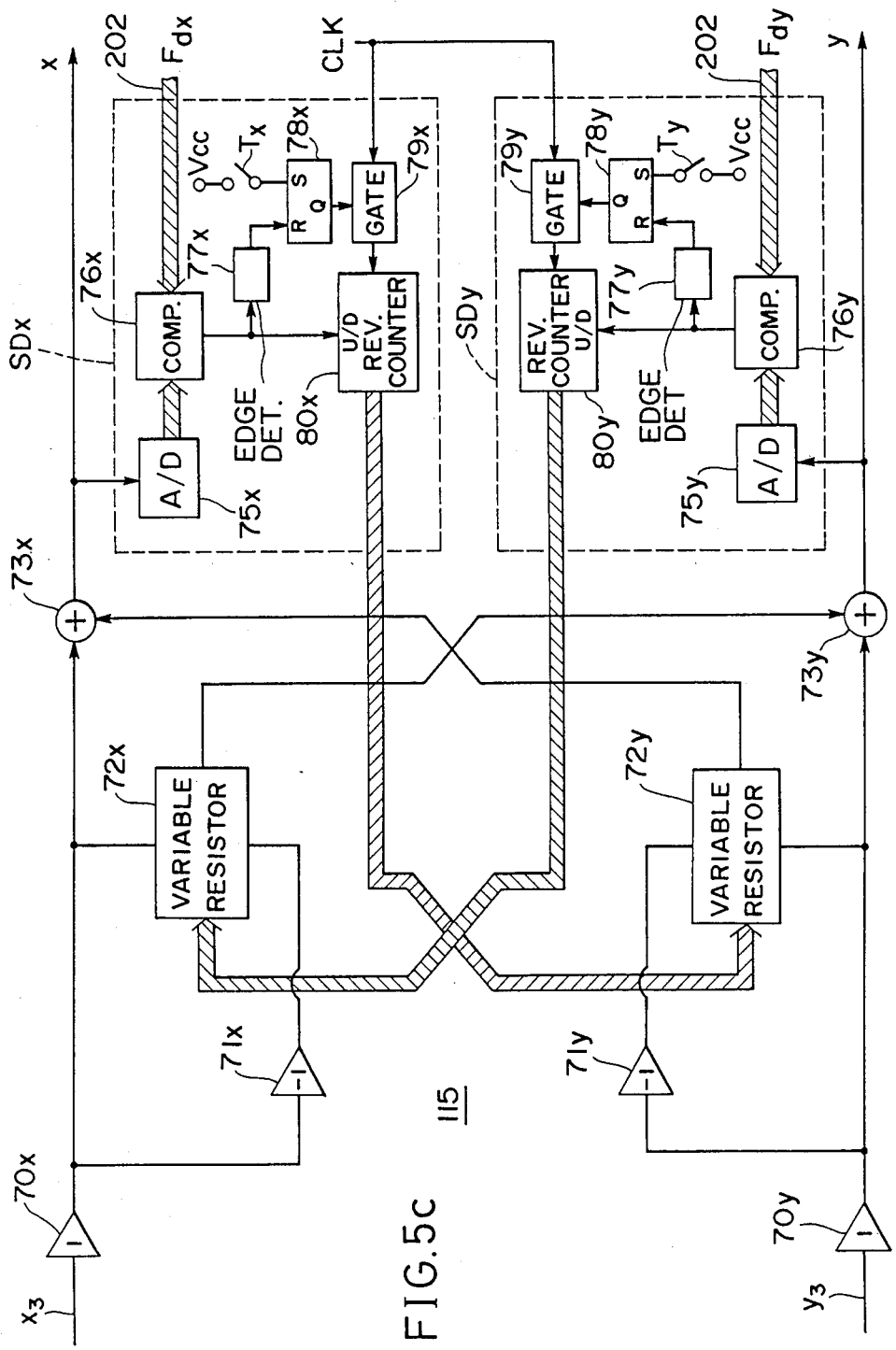

Details of the correction circuits 113-115 are shown in FIGS. 5a, 5b and 5c, respectively. In FIG. 5a, the x-axis corrector 113 generally comprises an adder circuit 130x and a scaling circuit 131x. Adder circuit 130x comprises a displacement detector DDx and an analog adder 50x to which the x-coordinate signal $x_1$ from writing pad 1 and the output of displacement detector DDx are supplied, the output of adder 50x being applied to an analog-to-digital converter 51x. The digital output of converter 51x is applied to a digital comparator 52x where it is compared with the x-coordinate origin $O_{dx}$ which is supplied as a reference on bus 200 from controller 116 for generating a comparator output which is low when the output of A/D converter 51x is lower than the reference and high when the former is higher than the latter. The comparator output is applied to an edge detector 53x and to the up-down control terminal of a reversible counter 56x. A flip-flop 54x is arranged to be set in response to operation of a manually operated switch Ox to enable a gate 55x to pass clock pulses from a source 100 to the clock input of reversible counter 56x. When the edge detector 53x detects either the rising or falling edge of the comparator output, the flip-flop 54 is reset to terminate the application of the clock pulse to counter 56x.

Reversible counter 56x of displacement detector DDx is initially preset to a digital value which corresponds to the analog value of zero voltage and is arranged to increment its count when the comparator output is low and decrement its count when the comparator output is high. A digital-to-analog converter 57x generates a voltage which is zero when the counter 56x is initially preset, increases in positive sense according to the amount of increment in the counter and decreases in negative sense according to the amount of decremental count value. The output of D/A converter 57x is summed with the x-coordinate voltage $x_1$ to generate an x-axis voltage $x_2$. The output of D/A converter 57x which is obtained upon the occurrence of a transition between high and low comparator outputs represents the difference between the voltage $x_1$ and an analog value of the origin $O_{dx}$, and hence it represents the x-axis displacement of the origin $O_i$ with respect to the origin $O_d$. A manually operated switch ADx is to set the flip-flop 54x to enable the counter 56x to initiate count operation.

Scaling circuit 131x includes a ratio detector RDx and a multiplier 58x formed by an operatinal amplifier 66x, a field-effect transistor 67x with its source and drain electrodes coupled between the output and inverting input of amplifier 66x and a resistor 68x connecting the output of adder 50x to the inverting input of amplifier 66x, the noninverting input of amplifier 66x being connected to ground. Field-effect transistor 67x acts as a variable resistance element to determine the gain of amplifier 66x in accordance with a control voltage applied to its gate from the ratio detector RDx. The voltage output of multiplier 58x is converted to digital form by an A/D converter 59x of the ratio detector and applied to a digital comparator 60x where it is compared with a digital value representing the x-axis full-scale point $F_{dx}$ on display area 18 which is supplied on bus 200 from controller 116. Similar to comparator 52x, comparator 60x generates an output which is low when the output of A/D converter 59x is lower than the reference $F_{dx}$ and is high when the former is higher than the latter. The output of comparator 60x is applied to an edge detector 61x and to the up-down control terminal of a reversible counter 64x.

A flip-flop 62x is arranged to be set in response to the operation of a manually operated switch Fx to enable a gate 63x to apply clock pulses from source 100 to the clock input of reversible counter 64x and is reset in response to an output from the edge detector 61x when it detects a transition between the high and low outputs of comparator 60x.

The initial value of reversible counter 64x corresponds to a voltage representing unity. Counter 64x is arranged to increment its count when the comparator output is low and decrement its count when the comparator output is high. A digital-to-analog converter 65x generates a voltage which is unity when the counter 56x is initially preset, increases according to the amount of increment in the counter to provide a voltage representing a greater-than-unity value and decreases according to the amount of decrement in the counter to provide a voltage representing a fractional value. The output of D/A converter 65x indicates the ratio of the x-axis full-scale on work area 11 to the x-axis full-scale on display area 18 and is supplied to the gate of field-effect transistor 67x and multiplied on the x-coordinate voltage $x_2$ to generate an x-axis coordinate voltage $x_3$, which is applied to the tilt corrector 115.

Y-axis corrector 114 shown in FIG. 5b is of identical construction to the x-axis corrector 113. Adder circuit 130y includes a displacement detector DDy and an adder 50y which generates a y-coordinate voltage $y_2$ by summing a y-axis offset voltage from D/A converter 57y with the y-coordinate voltage $y_1$ from writing pad 1 to correct it by an amount corresponding to the y-axis displacement of the origin $O_i$ with respect to the origin $O_d$. Displacement detector DDy comprises A/D converter 51y, digital comparator 52y, edge detector 53x, flip-flop 54y, gate 55y, reversible counter 56y and D/A converter 57y which cooperate to derive the y-axis offset voltage from the difference between the output of adder 50y and data representing the origin $O_{dy}$ on the y-axis of display area 18 which is supplied to comparator 52y on bus 201. A manually operated switch Oy is to set the flip-flop 54y to enable the counter 56y to initiate count operation.

Scaling circuit 131y is identical to scaling circuit 131x. Multiplier 58y multiplies the y-coordinate voltage $y_2$ by a y-axis full-scale ratio derived from the difference between the voltage $y_2$ and a corresponding analog value of the y-axis full-scale point data $F_{dy}$ by ratio detector RDy comprising A/D converter 58y, comparator 59y, edge-detector 61y, flip-flop 62y, gate 63y, reversible counter 64y and D/A converter 65y. Multiplier 58y supplies a y-axis coordinate voltage $y_3$ to the tilt corrector 115. A manually operated switch Fy sets the flip-flop 63y to enable the counter 64y to initiate count operation.

Tilt corrector 115, shown in FIG. 5c, receives the x-coordinate voltage $x_3$ through a unity gain buffer amplifier 70x and the y-coordinate voltage $y_3$ through a unity-gain buffer amplifier 70y. The output of amplifier 70x is applied to a first input of adder 73x and to one end of a digitally controlled variable resistor 72x of a known construction, and further applied through a unity-gain inverting amplifier 71x to the other end of the resistor 72x. Likewise, the output of amplifier 70y is applied to a first input of adder 73y and to one end of a digitally controlled variable resistor 72y and further applied through a unity-gain inverting amplifier 71y to the other end of the resistor 72y. A variable voltage developed in the resistor 72x is applied to the second input of adder 73y and a variable voltage developed in the resistor 72y is applied to the second input of adder 73x.

Resistor 72x is controlled by a slope detector SDy and resistor 72y is controlled by a slope detector SDx identical to detector SDy. Each of the slope detectors SDx and SDy comprises an A/D converter 75 which converts the output of adder 73 to a digital signal which is supplied to a digital comparator 76 for comparison with data representing the associated full-scale point reference data $F_d$ supplied on bus 202. The output of comparator 76, which is applied to an edge detector 77 and to the up-down control terminal of a reversible counter 80, is low when the output of A/D converter 75 is lower than the reference and high when the former is higher than the latter. A flip-flop 78 is set in response to switch T to enable a gate 79 to pass clock pulses from source 100 to the clock input of counter 80 and is arranged to be reset in response to an output from the edge detector 77 as the latter detects a transition between the high and low outputs of comparator 76 to terminate the application of the clock to counter 80.

Reversible counter 80x is preset to an initial count value which corresponds to zero-voltage output of the variable resistor 72y and reversible counter 80y is preset to an initial value corresponding to zero-voltage output of the resistor 72x. Counters 80x and 80y are incremented when the output of comparator 76 is low and decremented when it is high. The output of counter 80x, which represents the difference between the x-coordinate voltage $x_3$ and the analog equivalent of the full-scale reference data $F_{dx}$, is applied to the control terminal of variable resistor 72y. The output of counter 80y, which represents the difference between the y-coordinate voltage $y_3$ and the analog equivalent of full-scale reference data $F_{dy}$, is applied to the control terminal of variable resistor 72x.

The positive and negative values of the voltage $x_3$ are automatically proportioned by the variable resistor 72x to produce a voltage representing the displacement of a given point on the x axis of work area 11 from the corresponding point on the x axis of display area 18. This displacement value is added to the voltage $y_3$ in the adder 73x and fed to the controller 116. Likewise, the positive and negative values of the voltage $y_3$ are automatically proportioned by the variable resistor 72y to produce a voltage representing the displacement of a given point on the y axis of work area 11 from the corresponding point on the y axis of display area 18. This displacement value is added to the voltage $x_3$ in the adder 73x and fed to the controller 116.

In operation, pen 12 is positioned in the origin $O_i$ to apply a pair of x- and y-coordinate voltages corresponding to the origin $O_i$ to the adders 50x and 50y and switches Ox and Oy are closed to operate the displacement detectors DDx and DDy. Offset voltages representing the differences in coordinates between origins $O_i$ and $O_d$ are generated by detectors DDx and DDy and are summed respectively with the coordinate voltages $x_1$ and $y_1$. A pair of voltages $x_2$ and $y_2$ representing the x- and y-coordinates of the origin $O_d$ of display area 18 are generated by adders 50x and 50y, respectively and passed-through multipliers 58x and 58y, respectively, which are set at a unity gain at this moment, and through adders 73x and 73y of the tilt corrector 115 to the controller 116. The cursor is calibrated to the origin $O_d$.

Pen 12 is then moved to the x-axis full-scale point $F_{ix}$ to apply an x-coordinate voltage $x_1$ corresponding to that full-scale point through adder 50x to the multiplier 58x. Switch Fx is simultaneously closed to operate the ratio detector RDx to generate an output from D/A converter 65x which represents the ratio of the full-scale point $F_{ix}$ to the full-scale point $F_{dx}$, this ratio being multiplied on the input voltage of the multiplier 58x to produce a voltage $x_3$ representing the full-scale point $F_{dx}$ to which the cursor is moved. Pen 12 is then moved to the y-axis full-scale point $F_{iy}$ to apply a y-coordinate voltage $y_1$ corresponding to that full-scale point through adder 50y to the multiplier 58y. Switch Fy is simultaneously closed to operate the ratio detector RDy to generate an output from D/A converter 65y which represents the ratio of the full-scale point $F_{iy}$ to the full-scale point $F_{dy}$, this ratio being multiplied on the input voltage of the multiplier 58y to produce a voltage $y_3$ representing the full-scale point $F_{dy}$ to which the cursor is moved.

Pen 12 is then moved to a full-scale point $F_i$ to produce a pair of corresponding voltages $x_1$ and $y_1$ which are passed to adders 50x, 50y to produce voltages $x_2$ and $y_2$ and then to multipliers 58x, 58y to produce votages $x_3$ and $y_3$, which are applied to adders 73x and 73y, respectively. Switches Tx and Ty are simultaneously closed to operate the slope detectors SDx and SDy.

Figure 6A:
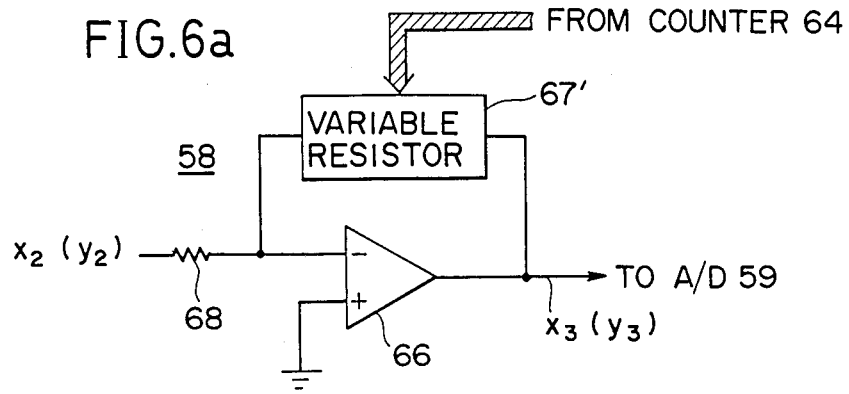
FIGS. 6a, 6b and 6c are illustrations of modified forms of the multipliers of FIGS. 5a and 5b.
Figure 6B:
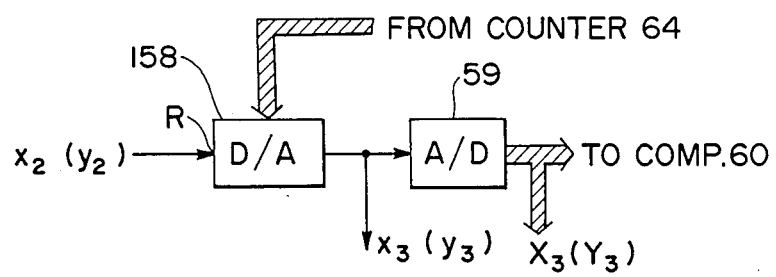
Figure 6C:
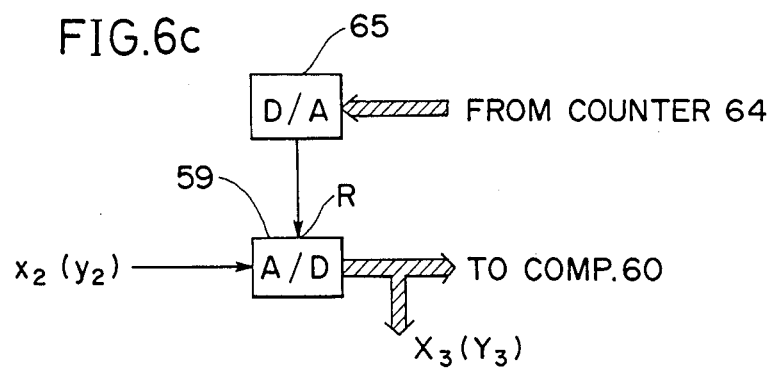

FIGS. 6a to 6c are illustrations of modified forms of the multipliers 58 of scaling circuits 131x and 131y. In FIG. 6a, the field-effect transistor 67 is replaced with a variable resistor 67' which is digitally controlled by the output of reversible counter 64 dispensing with the D/A converter 65. In FIG. 6b, the multiplier 58 of FIG. 6a is replaced with a digital-to-analog converter 158 of conventional design having a reference voltage terminal to which a voltage is to be applied from an external source as a reference. This reference voltage is usually maintained constant and determines the output voltage. In this modified embodiment, the reference voltage terminal R of D/A converter 158 is utilized as an input terminal of the voltages $x_2$ and $y_2$. The digital output of counter 64 is applied to the digital input of converter 158 and converted to a voltage which varies as a function of the value of the digital output multiplied by the value of the voltage $x_2$ or $y_2$. The modification of FIG. 6c is also advantageous if the tilt corrector 115 is of a configuration which exclusively responds to digital inputs in a manner as will be described later. The circuit of FIG. 6c differs from FIGS. 5a and 5b in that the output of D/A converter 65 is directly applied to a reference terminal of A/D converter 59. The A/D converter 59 is of a conventional type having a reference terminal to which a constant voltage is applied as a reference to determine the value of the digital output. This reference voltage is derived from the D/A converter 65 and the voltage output of adder 50 is directly applied to the analog input of A/D converter 59. As in the D/A converter 158 of FIG. 6b, the digital output of A/D converter 59 varies as a function of voltage $x_2(y_2)$ multiplied by the output of D/A converter 65.

Figure 7:
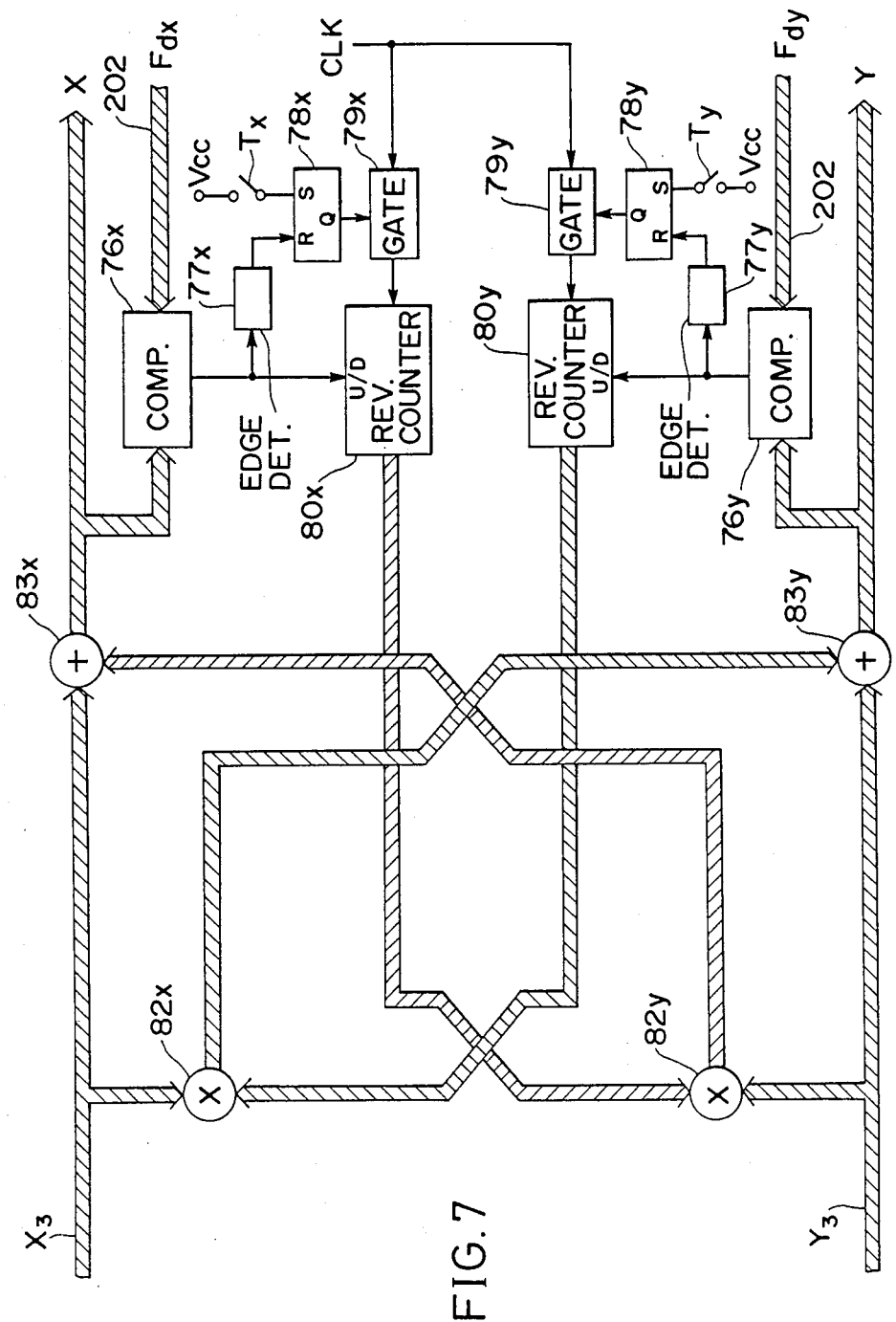
FIG. 7 is a diagrammatic view of a modified form of the tilt corrector of FIG. 5c.

A modified form of the tilt corrector 115 is shown in FIG. 7. This modification differs from FIG. 5c in that digital multipliers 82x and 82y and digital adders 83x and 83y are employed as illustrated. Digital outputs X and Y obtained at the outputs of A/D converters 59 of FIGS. 5a, 5b, 6a, 6b and 6c are applied to multipliers 82x and 82y where they are multiplied by the digital outputs of counters 80y and 80x, respectively, and further applied to adders 83x and 83y and summed with the digital outputs of multipliers 82y and 82x, respectively. The outputs of adders 83x and 83y are directly applied to digital comparators 76x and 76y, respectively. Slope detectors SDx and SDy are identical in function to those of FIG. 5c. Multiplier 82x supplies a digital equivalent of zero voltage to adder 83y when reversible counter 80y supplies an output corresponding to its initially preset count value. The digital output of multiplier 82x is a digital equivalent of a voltage which is positive when the counter 80x is incremented from the preset value and negative when it is decremented from the preset value. Likewise, multiplier 82y supplies a digital equivalent of zero voltage to adder 83x when reversible counter 80x supplies an output corresponding to its initially preset count value. The digital output of multiplier 82x is a digital equivalent of a voltage which is positive when the counter 80y is incremented from the preset value and negative when it is decremented from the preset value. The digital outputs of adders 83x and 83y are applied to the controller 116.

In the foregoing description, reference data are shown as being supplied to the correction circuits on buses 200, 201 and 202. This is advantageous for altering the size of display area 18 by entering altered reference data to the controller 116. It is apparent that the reference data could also be generated in the individual correction circuits. In such instances, no memory is needed for storing the reference data.

The foregoing description shows only preferred embodiments of the present invention. Various modifications are apparent to those skilled in the art without departing from the scope of the present invention which is only limited by the appended claims. Since the displacement detectors DD, ratio detectors RD and slope detectors SD operate only during the calibration mode and the apparatus utilizes the outputs of these detectors during data entry modes, the functions of these detectors can be effected by a sequence of programmed instructions in the controller 116. Therefore, the embodiments shown and described are only illustrative, not restrictive.

What is claimed is:

1. A graphic display appratus for providing a display of graphic data in a display area defined by X and Y coordinates, said display area having first, second, and third reference display positions, comprising:

a writing pad having a data entry surface defined by X and Y coordinates in which a rectangular work area is specified by a drawing sheet, the writing pad having means for generating X- and Y-coordinate position signals indicating the X and Y coordinate positions of a writing pen in said work area, said work area having first, second, and third reference work positions corrsponding respectively to said first, second, and third reference display positions, whereby said writing pad generates first and second reference X-coordinate position signals corresponding respectively to said first and second reference work positions and first and sescond reference Y-coordinate postions signals corresponding to said first and third reference work positions;

x-y corrector means having first, second, third and fourth trimmingfactors for calibrating the first refernece X- and y-coordiante position signals by respectively adjusting said first and second trimming factors during a calibration mode so that said first reference work position coincides with said first reference display position and for calibrating the second reference X- and Y-coordinate position signals by respectively adjusting said third and fourth trimming factors during said calibration mode so that the distance between said first and second reference work positions has a desired ratio to the distane between said first and second reference display positions, and the distance between said first and third reference work positions has a desired ratio to the distance between said first and third reference display positions, and said x-y corrector means correcting the X-coordinate position signal with the adjusted first and third trimming factors during a data entry mode and correcting the Y-coordinate position signal with the adjusted second and fourth trimming factors during said data entry mode;

tilt corrector means having fifth and sixth trimming factors for calibrating the calibrated reference X-and Y-coordinate position signals by respectively adjusting said fifth and sixth trimming factors during said calibration mode so that said second and third reference work positions coincide respectively with said second and third reference display positions, and said tilt corrector means correcting the X-and Y-coordinate position signals corrected by sadi x-y corrector means with the adjusted fifth and sixth trimming factors respectively during said data entry mode; and controller means for controlling the X-Y coordinate position of a cursor in said display area in response to the calibrated X- and Y- coordinate position signals from said tilt corrector means in order to locate said cursor in said first, second, and third reference display positions and in response to the corrected X- and Y-coordinate position signals from said tilt corrector means to locate said cursor in corrected display positions.

2. A graphic dispaly apparatus as claimed in claim 1 wherein said x-y corrector means comprises:

means for generating a first potential which is manually variable between positive and negative values in accordance with said first trimming factor;

first x-axis adder means for summing said first potential to the X-coordinate position signal from said writing pad;

first x-axis scaling means for scaling an output signal from said first x-axis adder means by said third trimming factor;

means for generating a second potential which is mannually variable between positive and negative values in accordance with said second trimming factor;

first y-axis adder means for summing said second potential with the Y-coordinate position signal from said writing pad; and first y-axis scaling means for scaling an output signal from said first y-axis adder means in accordance with said fourth trimming factor, and wherein said tilt corrector means comprises:

second x-axis scaling means for scaling an output signal from said first x-axis scaling means in accordance with said fifth trimming factor;

second y-axis scaling means for scaling an output signal from said first y-axis scaling means in accordance with said sixth trimming factor;

second x-axis adder means for summing an output signal from said first x-axis scaling means with an output signal from said second y-axis scaling means for generating an x-axis output signal for application to said controller means; and second y-axis adder means for summing an output signal from said first y-axis scaling means with an output signal from said second x-axis scaling means for genrating a y-axis output signal for application to said controller means.

3. A graphic display apparatus as claimed in claim 1, wherein said x-y axis corrector means comprises:

X displacement detectior means for detecting a difference between said first reference X-coordinate position signal and a voltage representing said first reference display postion on the X coordinate;

X ratio detector means for detecting a ratio of said second reference X-coordinate position signal to a voltage representing said second reference display position on the X coordinate;

X adder means for summing the X-coordinate position signal from said writing pad with the difference detected by said X displacement detector means;

X multiplier means for multiplying an output signal from said X adder means by the detected ratio;

Y displacement detector means for detecting a difference between said first reference Y-coordinate position signal and a voltage representing said first reference display postion on the Y coordinate;

Y ratio detector means for detecting a ratio of said second reference Y-coordinate position signal to a voltage representing said third reference display position on the Y coordinate;

Y adder means for summing the Y-coordinate position signal from said writing pad with the differnece detected by the Y displacement detector means; and Y multiplier means for multiplying an output signal from said Y adder by the ratio detected by the Y ratio detector means, and wherein said tilt corrector means comprises:

an X variable resistor;

X- non-inverting amplifier means for applying an output signal from said X multiplier means to one end of said X variable resistor;

X inverting amplifier means for coupling the output signal of said X multiplier means to the other end of said X variable resistor;

a Y variable resistor;

Y non-inverting amplifier means for coupling an output signal from said Y multiplier means to one end of said Y variable resistor;

Y inverting amplifier means for coupling the output signal of said y multiplier means to the other end of said Y variable resistor;

X adder means for summing an output signal from said X non-inverting amplifier means with a potential developed by said Y variable resistor to generate an x-axis output for application to said controller means;

Y adder means for summing an output signal from said Y non-inverting amplifier means with a potential developed by said X variable resistor to generate a y-axis output for application to said controller means;

X slope detector means for detecting a difference between said x-axis output and a value representing said second reference display position and controlling said Y variable resistor with the detected difference; and Y slope detector means for detecting a difference between said y-axis output and a value representing said third reference display position and controlling said X variable resistor with the last-mentioned detected difference.

4. A graphic display apparatus as claimed in claim 1, wherein said x-y axis corrector means comprises:

x displacement detector means for detecting a difference between said first reference X-coordinate position signal and a voltage representing said first reference display position on the X coordinate;

X ratio detector means for detecting a ratio of said second reference X-coordinate position signal to a voltage representing said second reference display position on the X coordinate;

x adder means for summing the X-coordinate position signal from said writing pad with the difference detected by said X displacement detector means;

X multiplier means for multipling an output signal from said x adder means by the detected ratio;

y displacement detector means for detecting a difference between said first reference Y-coordinate position signal and a voltage representing said first reference display position on the Y coordiante;

Y ratio detector means for detecting a ratio of said second reference Y-coordinate position signal to avoltage representing said third reference display position on the Y coordinate;

Y adder means for summing hte Y-coordinate position signal from said writing pad with the difference detected by the Y displacement detector means; and Y multiplier means for multiplying an output signal from said Y adder means by the ratio detected by the Y ratio detector means, and wherein said tilt corrector means comprises:

X multiplier means for multiplying an output signal from the Y multiplier means of said x-y corrector means by a Y variable factor;

Y multiplier means for multiplying an output signal from the Y multiplier means of said x-y corrector means by an X variable factor;

X adder means for summing an output signal from said X multiplier means of said x-y corrector means with an output signal from the last-mentioned Y multiplier means to generate an x-axis output for application to said controller means;

Y adder means for summing an output signal from said Y multiplier means of said x-y corrector means with an output signal from the last-mentioned X multiplier means to generate a y-axis output for application to said controller means;

X slope detector means for detecting a difference between said x-axis output and a value representing said second reference display position and for applying the detected difference to the last-mentioned Y multiplier means as said Y variable factor; and Y slope detector means for detecting a difference between said y-axis output and a value representing said third reference display position and applying the last-mentioned detected difference to the last-mentioned X multiplier means as said X variable factor.

* * * * *